Dec. 15, 1959     P. J. STRAUSS     2,916,984
ADJUSTABLE TOASTING APPLIANCES
Filed Jan. 8, 1959     3 Sheets-Sheet 1

INVENTOR.
PHILIP J. STRAUSS
BY
ATTORNEY

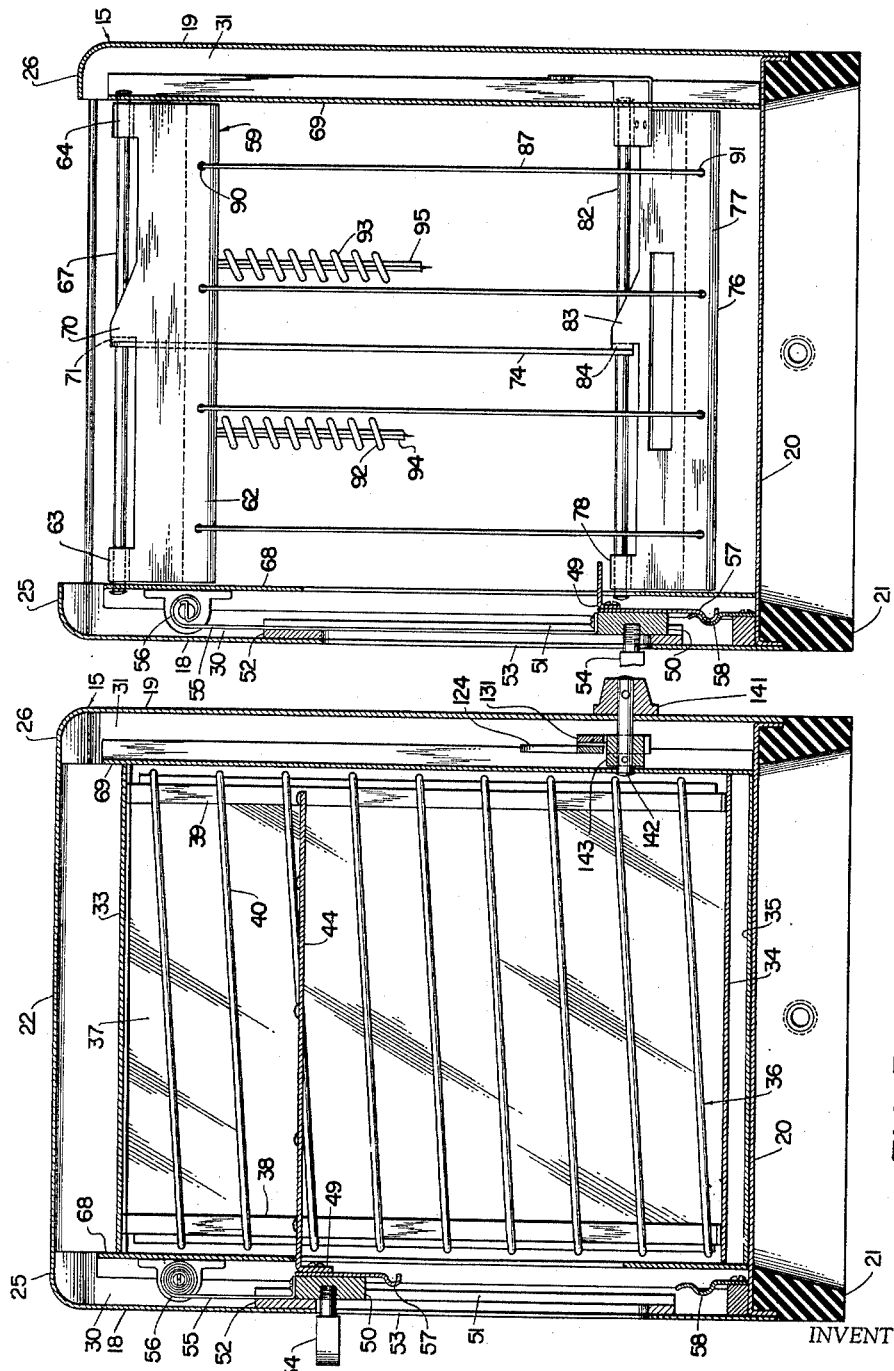

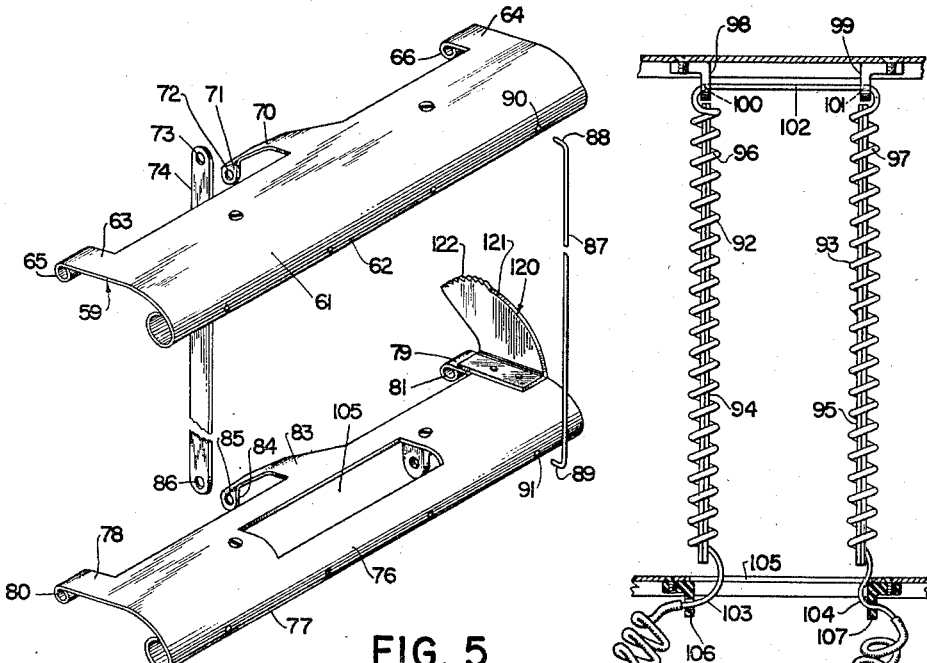
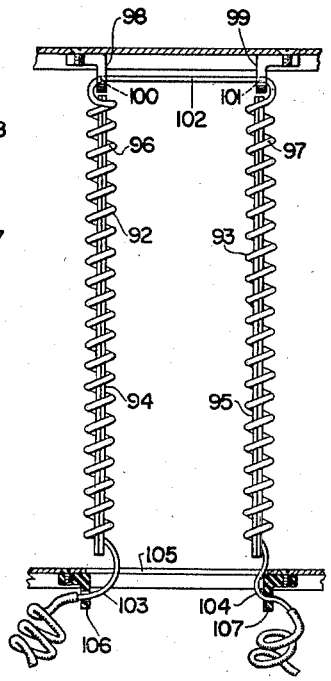
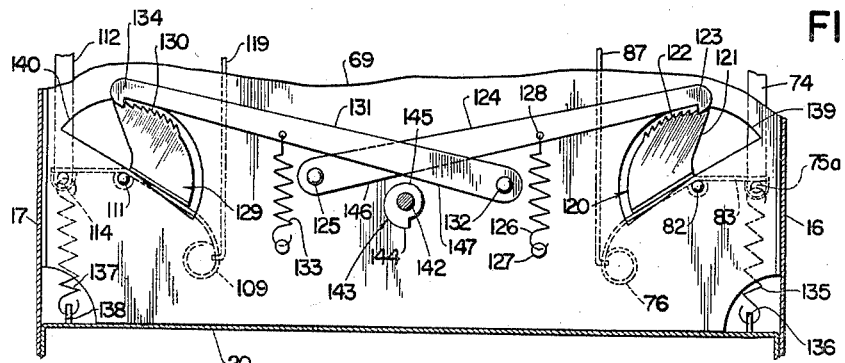
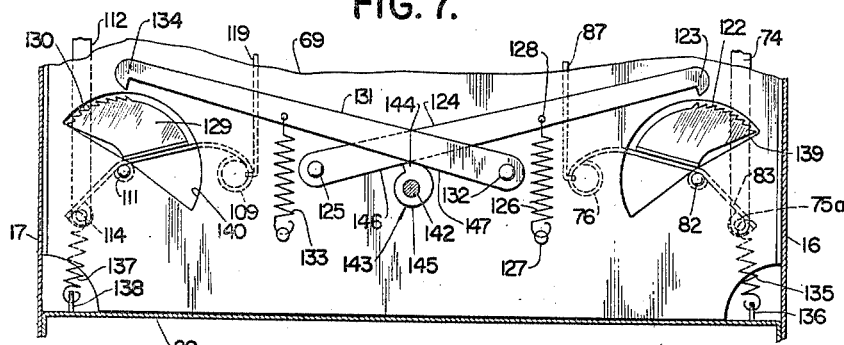
Dec. 15, 1959 — P. J. STRAUSS — 2,916,984
ADJUSTABLE TOASTING APPLIANCES
Filed Jan. 8, 1959 — 3 Sheets-Sheet 3
FIG. 5
FIG. 6
FIG. 7
FIG. 8
INVENTOR.
PHILIP J. STRAUSS
BY ATTORNEY United States Patent Office 2,916,984
Patented Dec. 15, 1959

2,916,984
ADJUSTABLE TOASTING APPLIANCES
Philip J. Strauss, Brooklyn, N.Y.
Application January 8, 1959, Serial No. 785,646
8 Claims. (Cl. 99—390)

This invention relates to adjustable toasting appliances, and is particularly directed to toasters with variable heating spaces between heating elements for operatively accommodating different thicknesses of bread slices or other articles to be toasted.

In conventional toasters having stationary heating elements flanking and defining the heating chamber, bread slices of different thicknesses are at correspondingly different distances from the heating elements, producing different and generally unpredictable toasting results. Attempts have been made to correct this condition by various complicated expedients, such as by combining two narrow heating chambers into one wide chamber, shifting compartment walls, and moving the opposed heating elements by camming, gearing and other complicated mechanisms. Moreover, all such prior attempts have required manual or intricate automatic adjusting devices.

It is my objective to provide a toaster which has none of the shortcomings above mentioned, and in which there is an automatic adjustment of the inlet openings and effective heating spaces without the need to manually manipulate separate adjusting means. More specifically, it is an object of my invention to effect an adjustment of one or more inlet openings by the mere act of inserting the bread slice, whereby the thickness of the slice will itself determine the distance between coacting heating elements. And in this aspect of my invention it is a further and important object to maintain the heating elements at equal distances from the adjacent bread surfaces regardless of the thickness of the slice, so as to produce uniform toasting results on bread slices of all different thicknesses that can be operatively accommodated within the device.

Another object of my invention is to provide a toaster with a plurality of heating chambers in which the respective widths of inlet openings and the respective positions of the adjustable heating elements for each chamber can be independently varied.

And it is my objective to provide a relatively simple low-cost toaster having the aforesaid features and advantages.

Other objects, features and advantages will appear from the drawings and the description hereinafter given.

Referring to the drawings,

Fig. 1 is a plan view of a toasting device embodying a form of my invention.

Fig. 2 is a section of Fig. 1 taken along line 2—2, the left side showing the wing sections and associated parts in an operatively raised position, the right side showing the opposite wing sections and associated parts in an operatively lowered position, the platform being shown in an elevated position, the dot-dash lines showing fragments of bread slices in the process of being inserted in the toaster.

Fig. 3 is a section of Fig. 1 taken along line 3—3.

Fig. 4 is a section of Fig. 1 taken substantially along line 4—4, but showing the platform and a wing section with its associated parts in lowered positions.

Fig. 5 is a perspective disassembled view of two coacting wing sections, a connecting link, and one of the guard wires.

Fig. 6 is a fragmentary section of Fig. 2 taken substantially along line 6—6, showing only the heating member and supports therefor.

Fig. 7 is a fragmentary sectional elevation of Fig. 1 taken substantially along line 7—7, showing the wing sections in the lowest positions.

Fig. 8 is a fragmentary section substantially like Fig. 7, but showing the wing sections in the operatively raised positions and the pawls in their disengaged positions.

Figure 1:
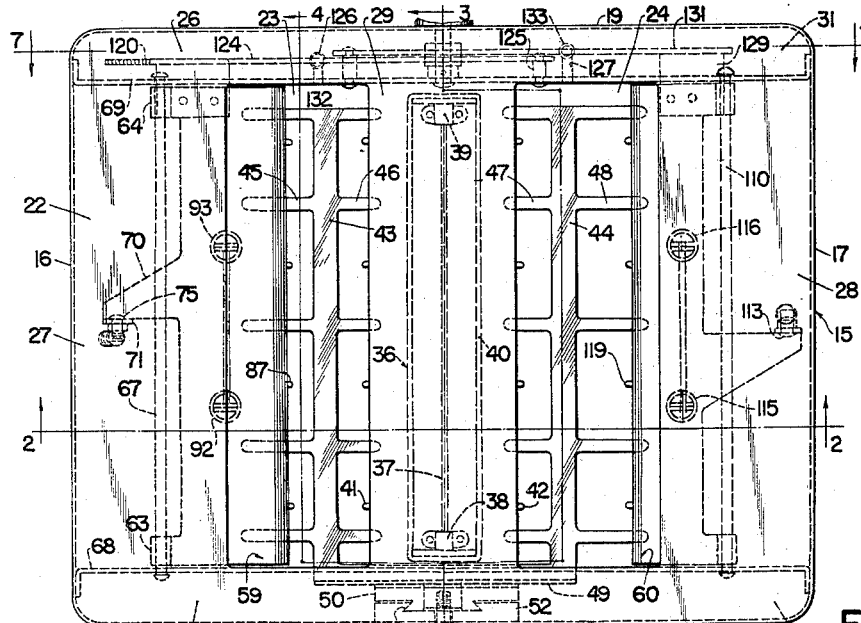

In the embodiment of my invention illustrated in the drawings, the outer casing generally designated 15 comprises the side walls 16 and 17, front and rear walls 18 and 19, respectively, base 20 supported by legs 21, and the upper wall generally designated 22 having apertured portions 23 and 24 serving as entrance openings for bread slices operatively inserted into the interior of the toaster, in a manner to be hereinbelow set forth. The said upper wall comprises the front and rear peripheral sections 25 and 26, respectively, the lateral sections 27 and 28, and the central dividing wall section 29 connecting the said respective front and rear peripheral sections 25 and 26, the latter overlying the respective front and rear compartments 30 and 31 for housing certain mechanism to be hereinbelow described. The said central wall section 29 has depending downwardly therefrom the opposite walls 32a (see Fig. 2) supporting the plate 33, said latter walls and plate forming a bracket generally designated 32. Plate 33 together with the plate 34 of the bottom bracket 35 supports the central heating member generally designated 36. In the form of my invention illustrated, said heating member comprises the central insulating wall 37, the lateral supports 38 and 39 and the resistance element 40. It is not deemed necessary, for the purpose of this specification, further to describe said heating member, since it is well known to those skilled in the art, a further description not being required for an understanding of this invention. Also supported by said brackets 32 and 35 are the vertical guard wires 41 and 42 forming protective grids flanking said heating member 36.

Disposed below the said entrance openings 23 and 24 are the two vertically movable platforms 43 and 44 having laterally extending sets of branches 45, 46, 47 and 48 for supporting bread slices operatively disposed within the toaster. Said platforms 43 and 44 are connected by bar 49 disposed in the said front compartment 30, the bar being secured to the slide member 50 slidably movable within the dovetail groove 51 in the vertical guide member 52 supported by said front wall 18 (see Figs. 1 and 3). Secured to the said slide member 50 and extending outwardly through the slot 53 in said wall 18 is the knob member 54, the arrangement being such that a manipulation of the knob member 54 so as to cause it to move vertically within slot 53 will cause a corresponding movement of both platforms 43 and 44. Secured to the upper part of slide member 50 is the flexible cable 55 extending from the spring reel member 56 around which said cable 55 is wound, in conventional manner. The said cable 55, being spring-loaded, resists the downwardly movement of the slide member 50, yieldably urging it and the connected platforms 43 and 44 upwardly into a predetermined inoperative position, such as that shown in Figs. 2 and 3. No further description is given of the spring reel device 56, inasmuch as it is well known to those skilled in the art. Attached to and extending downwardly from slide member 50 is the latch element 57 adapted for releasable locking engagement with the coacting spring latch element 58, the latter being releasable by thermostatic means not shown, the latter means not being shown in detail since it is of conventional construction known to those skilled in the art. When the platform is lowered to its lowermost position by the manual depression of said knob 54, the latch element 57 will be in operative engagement with said coactive element 58, as aforesaid (see Fig. 4), thereby maintaining the platforms 43 and 44 in their lowermost position until automatically released by the thermostatic action of latch element 58.

The components of the toaster above described are of generally conventional nature, and cooperate with certain novel components constituting my invention, as will hereinbelow be described.

Figure 2:
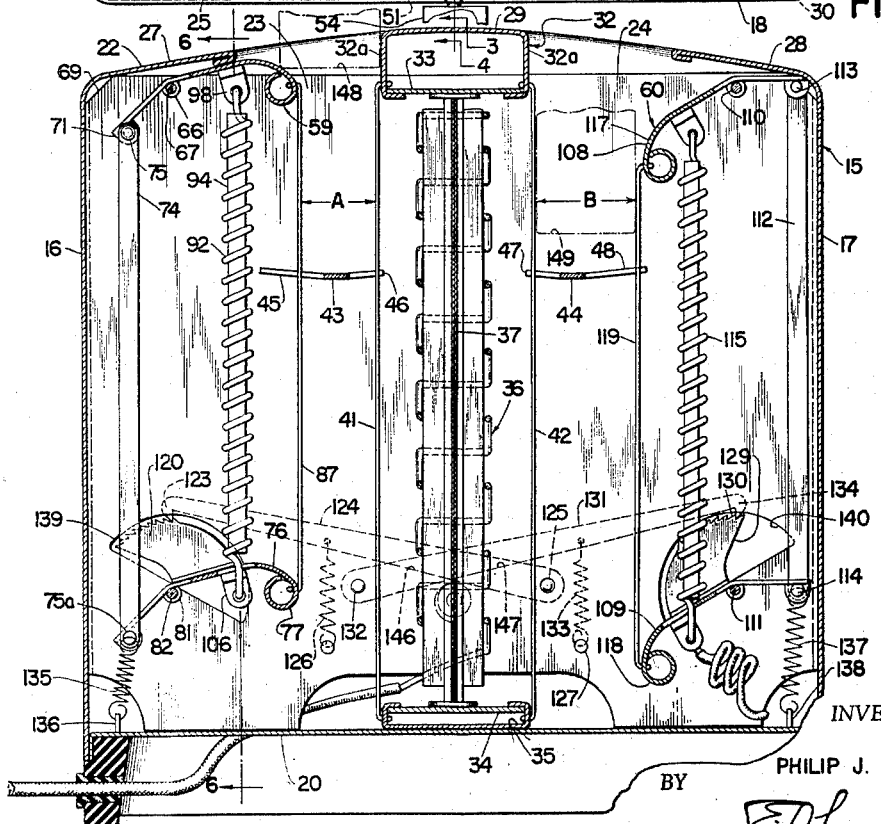

Adjacent said top lateral walls 27 and 28 are the two pivotally mounted gate members 59 and 60, respectively; these being movable downwardly when engaged by slices of bread being operatively inserted through the entrance openings 23 and 24—whereby the widths of said openings—formed by said respective gate members 59 and 60 and said central dividing wall section 29—are varied in accordance with the respective positions of said gates. The uppermost position of said gates, such as the position of gate 59 as illustrated in Fig. 2, defines the minimum entrance opening of a width designated A, the lowered position of said gates, such as the position of gate 60 in said Fig. 2, defining the relatively greater entrance opening of a width designated B—all as will more clearly hereinafter appear.

Gate 59 comprises the wing section 61 consisting of a wall curled under at the inner leading edge to provide a smooth surface 62 for contact with bread slices (see Fig. 5), said wing section having two lateral outwardly extending extensions 63 and 64 with respective loop sections 65 and 66 rotatably mounted over the rod 67 supported by the respective front and rear inner partition walls 68 and 69 which form the inner walls of said respective compartments 30 and 31. Wing section 61 also contains, opposite said surface 62, the extension 70 with the downwardly extending wall 71 having the aperture 72 therein, the latter being in registry with the aperture 73 of the downwardly extending connecting link 74 (to be hereinafter more fully described), the fastener member 75 (see Figs. 1 and 2) extending through said apertures 72 and 73 whereby said link 74 is pivotally connected to the extension 70. Disposed at the lower portion of the toaster and in substantially vertical registry with wing section 61 is the wing section 76 corresponding in proportions and configuration to said section 61—said wing section 76 having an inner curled portion presenting the smooth surface 77, and having extensions 78 and 79 with respective loops 80 and 81 rotatably mounted on the rod 82 attached to partition walls 68 and 69, respectively. Wing section 76 also contains the extension 83, corresponding to the section 70 above mentioned, having a wall 84 with an aperture 85 therein, the said link 74 containing bottom aperture 86 in registry with aperture 85, there being a pivotal fastener 75a extending through said apertures 85 and 86.

The arrangement is hence such that the said link 74 is pivotally connected to both of said wing sections 61 and 76; and since said rods 67 and 82 are parallel to each other, any operative vertical movement of said link 74 will cause corresponding simultaneous parallel pivotal movements of said wing sections 61 and 76. Connecting said smooth leading edge portions 62 and 77 of said wing sections are the wire guards 87 with bent sections 88 and 89 extending into correspondingly positioned holes 90 and 91 in said respective wing sections (see Figs. 4 and 5). Disposed between said wing sections 61 and 76 are the vertical heating members 92 and 93, these having insulating supports 94 and 95 carrying resistance coils 96 and 97, respectively, brackets 98 and 99 attached to the underside of wing section 61 (see Fig. 6) having the respective apertures 100 and 101 through which extends the wire section 102 joining both of said coils 96 and 97. The lower portions 103 and 104 of said coils extend through the aperture 105 in wing section 76, and through the respective apertured brackets 106 and 107 attached to the underside of said wing section 76.

The electrical connections of said heating elements 96 and 97, as well as the aforementioned heating element 40, are not herein shown in detail, since they are well known to those skilled in the art, a further description thereof not being necessary for an understanding of the present invention. Suffice it to say that said heating elements 96 and 97 are in fixed relation with respect to each other and with respect to said guide wires 87 during the operative pivotal movement of said wing sections 61 and 76.

The opposite gate 60 contains a wing section 108 comprising a wall similar in configuration and proportions to said wing section 61, there being therebelow, and in vertical registry therewith, a bottom wing section 109 corresponding to the bottom wing section 76 above mentioned. Both of these wing sections are pivotally mounted on the rods 110 and 111, and are connected by the link 112 which is pivotally connected to the respective wing sections 108 and 109 at 113 and 114, substantially as described with reference to the corresponding oppositely positioned wing sections. Operatively mounted between said wing sections 108 and 109 are the electric resistance coils 115 and 116; and connecting the inner smooth leading edges 117 and 118 of said wing sections 108 and 109 are the vertical guard wires 119.

Referring again to said lower wing section 76, it will be noted that mounted on the rearward side thereof is the ratchet member 120, this having an upstanding wall 121 with an upper toothed periphery 122 of generally arcuate configuration and concentric about the pivotal axis at 82. In engagement with said toothed periphery 122 is the tip 123 of the pawl arm 124 pivotally mounted at 125 on wall 69. A spring 126 anchored on pin 127 on wall 69 is connected to the lever at 128, yieldably urging said pawl tip 123 into engagement with said toothed edge 122 (see Fig. 7). Similarly, mounted on lower wing section 109 is the ratchet member 129 having the upper toothed periphery 130 at 111 of generally arcuate configuration and concentric about the pivotal axis. There is also a pawl arm 131, corresponding to said pawl 124, oppositely positioned and mounted at 132 on said rear compartment wall 69, the spring 133 yieldably urging the lever downwardly so that the pawl tip 134 of said pawl 131 is in yieldable engagement with toothed edge 130, in the manner aforesaid.

Attached to the fastener 75a at the bottom of link 74 is the spring 135 anchored at 136 to the base 20 of the toaster; and similarly, the spring 137 is attached to fastener 114 at the bottom of link 112 and anchored at 138 to said base 20. It is thus apparent that the springs 135 and 137 are yieldably urging said respective links 74 and 112 downwardly, for effecting operative upward pivotal movements of said wing sections 61, 76 and wing sections 108, 109.

The said rear compartment wall 69 contains apertured portions 139 and 140, the adjacent lateral end portions of wings 76 and 109 extending through said respective apertured portions into the said rear compartment 31, whereby said ratchet members 120 and 129 are disposed in said compartment. Disposed exteriorly of the rear outer wall 19 is the release knob 141 mounted upon the shaft 142 which is itself rotatably mounted on said outer wall 19 and the compartment wall 69. Fixedly secured to said shaft is the release cam 143 having a high point 144 and a low point 145 (see Figs. 7 and 8). Said release cam is engageable with the under surfaces 146 and 147 of the respective pawls 124 and 131, the arrangement being such that when the cam 143 is rotatably manipulated the high point 144 will engage said surfaces 146 and 147 to elevate said respective pawls 124 and 131 to their uppermost positions. In Fig. 8, the said pawls are shown in their elevated positions, the respective pawl tips being shown in their respective inoperative positions above and out of engagement with the respective toothed edges of the ratchets 120 and 129. The relative positions of said pawls, in said two extreme positions, are also shown in Fig. 2—the left side of the figure showing the pawl 124 in its elevated position with the pawl tip 123 in engagement with the extreme innermost tooth of ratchet 120, said wing sections 61 and 76 being in their uppermost positions—and the right side of the figure showing the pawl 131 in its lowermost position with the pawl tip 134 in engagement with the extreme outermost tooth of ratchet 129, the corresponding wing sections 108 and 109 being in correspondingly lowered positions.

When the device is in its normal inoperative position, all the wing sections are in their uppermost positions, and the platforms 43 and 44 are also in their upper positions illustrated in Fig. 2. If a thin slice of bread, equal to or less than the minimum opening designated by the letter A is inserted in either of the entrance openings 23 and 24, a downward depression of the knob 54 will bring the slice down into its operative position within the toaster, without in any way affecting the positions of the said wing sections. The respective coacting guard wires 41, 87 and 42, 119, keep the bread out of contact with the heating elements; and where the bread slice is in slidable engagement with said respective guards, the opposite surfaces of the slice are at all times maintained in predetermined unchanging spaced relation to the heating elements flanking the bread. It should be noted that in the preferred construction the heating elements 92, 93 are spaced from guard wires 87 the same distance as the facing portions of central heating element 40 are spaced from guard wires 41; and similarly, the heating elements 115 and 116 are spaced from the guard wires 119 the same distance as the facing portions of central heating element 40 are spaced from the guard wires 42.

When a slice of bread thicker than the minimum width A is inserted, such as the slices 148 and 149 designated by dot-dash lines (Fig. 2), the respective wing sections 61 and 108 of the respective gates 59 and 60 are contacted by the bread, a continued downward movement thereof by manual pressure causing a pivotal downward movement of the coacting wing sections in the right and left sides of the toaster against the action of said springs 135 and 137—these being of sufficiently light tension to permit a ready operative depression of said wing sections. The downward pivotal travel of said wing sections is obviously dependent upon the width of the slice of bread, within predetermined maximum limits. Thus on the right side of the toaster as shown in Fig. 2, the operative insertion of slice 149 has caused a pivotal downward movement of the wing sections 108 and 109 to the positions indicated (it being understood that, as aforesaid, prior to the insertion of the bread the platforms 43 and 44 have been operatively depressed).

It should be observed that upon an operative turning of the knob 141 to bring the release cam 143 to its nonelevating position, while the coacting wing sections are in their uppermost positions, the pawl tips will engage the ratchet teeth in a manner to permit the operative lowering of said wing sections. This condition is illustrated on the left side of Fig. 2, the pawl tip 123 being in engagement with the extreme innermost tooth. As is clearly shown in the drawing, the direction of the ratchet teeth is such as to enable the wing section 76 to rotate in a clockwise direction without any interference by pawl 124, said pawl being gravitationally lowered with the lowering of the wing section. However, since said wing section, when operatively elevated, must necessarily revolve in a direction opposite to that while it is being lowered, the lowered pawl will so engage the ratchet teeth as to prevent a raising of the wing section—unless the pawl is operatively released from its holding position by the release cam 143 upon the rotation of knob 141. The lowered or holding position of the pawl is illustrated on the right side of Fig. 2.

The arrangement, in the particular embodiment illustrated, is accordingly such that the wing sections will remain in their lowered position even when the respective platforms 43 and 44, with the toasted bread slices thereon, are operatively returned to their upper positions. Hence, should the bread shrink during the toasting process, the changed thickness of the slice will not affect the position of the wing sections, so that the bread will be operatively elevated, after toasting, without interference by the wing sections. Moreover, if it is desired that successive bread slices of equal thickness be toasted with uniform toasting results, each of the wing sections, set into an operative lowered position by the first slice, may be kept in such lowered position for each successive slice.

It is evident, as aforesaid, that the downward pivotal movements of the cooperative sets of wing sections carrying the respective heating members 92, 93 and 115, 116 are dependent upon the width of the slice of bread being operatively inserted, within the dimensional limitations of the device. No sliding or shifting of parts, or manual adjustment of openings are required—nothing more being required than the mere operation of inserting the slice of bread after the operative depression of the platforms 43 and 44. Both sides of the toaster can accommodate bread slices of different thickness, giving the toaster great flexibility. Regardless of the operative positions of the said wing sections, the opposite surfaces of the slice of bread are at all times spaced away from the opposite heating elements the same predetermined distance, inasmuch as the distance of the movable heating elements from the respective guard wires 87 and 119 does not vary regardless of the position of the corresponding wing sections. The bread can thus be uniformly toasted on both surfaces, regardless of its thickness. This is further assured by the arrangement whereby the bread is at all times caused to be in operative engagement with the opposing guard wires 42, 119 and 41, 87.

As is apparent, an essential feature of my invention is the pivotally mounted gate, the embodiment illustrated having two such gates 59 and 60 coacting with stationary dividing section 29 to form the two inlet portions 23 and 24. My invention is not, however, limited to this particular construction wherein a variable inlet portion is formed by one pivotal and one stationary wall, since it is within my contemplation to employ said novel gate construction in other arrangements, such as by forming a variable inlet opening by the use of two spaced pivotal gates each operatively supporting heating elements therebelow. The invention has been disclosed herein merely by way of example and in preferred manner; but obviously many variations and modifications may be made therein. It is to be understood, therefore, that the invention is not limited to any specific form or manner of practicing same, except insofar as such limitations are specified in the appended claims.

I claim:

1. In a toaster, a casing defining an internal heating chamber and having a variable upper inlet portion communicating with said chamber, said inlet portion having at a lateral side thereof a substantially horizontally extending upper wing section pivotally mounted at the upper portion of the casing and rotatable about a horizontal axis, the inner leading edge of said wing section defining one side of said inlet portion, said wing section being proportioned and positioned for engagement by the article to be toasted upon the operative insertion thereof into said inlet portion, said wing section being movable between a normal retracted position to operative projected positions within said chamber, whereby different operative positions of said wing section determine different widths of the inlet portion in accordance with the thickness of said article, a lower pivotally mounted wing section in substantial vertical registry with said upper wing section, connecting means between said wing sections, said wing sections, their pivotal mountings and said connecting means being so proportioned and positioned that both of said wing sections will operatively move in unison, a support within said chamber below said inlet portion for receiving thereon the article to be toasted, and an electrical heating member attached to and disposed between said wing sections, whereby the heating member will move with said wing sections as they are operatively being moved by the article to be toasted, said wing sections having extensions in substantial vertical registry and disposed opposite the respective leading edges of said sections, said connecting means comprising a link pivotally connected to said extensions.

2. In a toaster, a casing defining an internal heating chamber and having a variable upper inlet portion communicating with said chamber, said inlet portion having at a lateral side thereof a substantially horizontally extending upper wing section pivotally mounted at the upper portion of the casing and rotatable about a horizontal axis, the inner leading edge of said wing section defining one side of said inlet portion, said wing section being proportioned and positioned for engagement by the article to be toasted upon the operative insertion thereof into said inlet portion, said wing section being movable between a normal retracted position to operative projected positions within said chamber, whereby different operative positions of said wing section determine different widths of the inlet portion in accordance with the thickness of said article, a lower pivotally mounted wing section in substantial vertical registry with said upper wing section, connecting means between said wing sections, said wing sections, their pivotal mountings and said connecting means being so proportioned and positioned that both of said wing sections will operatively move in unison, a support within said chamber below said inlet portion for receiving thereon the article to be toasted, and an electrical heating member attached to and disposed between said wing sections, whereby the heating member will move with said wing sections as they are operatively being moved by the article to be toasted, and a plurality of substantially vertically disposed guard wires operatively connecting said leading edges of said wing sections and in spaced relation to said heating member, whereby said guard wires are adapted for engagement with an article operationally inserted for toasting in said heating chamber.

3. In a toaster, a casing defining an internal heating chamber and having a variable upper inlet portion communicating with said chamber, said inlet portion having at a lateral side thereof a substantially horizontally extending upper wing section pivotally mounted at the upper portion of the casing and rotatable about a horizontal axis, the inner leading edge of said wing section defining one side of said inlet portion, said wing section being proportioned and positioned for engagement by the article to be toasted upon the operative insertion thereof into said inlet portion, said wing section being movable between a normal retracted position to operative projected positions within said chamber, whereby different operative positions of said wing section determine different widths of the inlet portion in accordance with the thickness of said article, a lower pivotally mounted wing section in substantial vertical registry with said upper wing section, connecting means between said wing sections, said wing sections, their pivotal mountings and said connecting means being so proportioned and positioned that both of said wing sections will operatively move in unison, a support within said chamber below said inlet portion for receiving thereon the article to be toasted, and an electrical heating member attached to and disposed between said wing sections, whereby the heating member will move with said wing sections as they are operatively being moved by the article to be toasted, each of said wing sections having bracket members thereon, said heating member being pivotally connected to said bracket members, said lower wing section having an apertured portion therein, said heating member extending downwardly through said apertured portion.

4. In a toaster, a casing defining an internal heating chamber and having a variable upper inlet portion communicating with said chamber, said inlet portion having at a lateral side thereof a substantially horizontally extending upper wing section pivotally mounted at the upper portion of the casing and rotatable about a horizontal axis, the inner leading edge of said wing section defining one side of said inlet portion, said wing section being proportioned and positioned for engagement by the article to be toasted upon the operative insertion thereof into said inlet portion, said wing section being movable between a normal retracted position to operative projected positions within said chamber, whereby different operative positions of said wing section determine different widths of the inlet portion in accordance with the thickness of said article, a lower pivotally mounted wing section in substantial vertical registry with said upper wing section, connecting means between said wing sections, said wing sections, their pivotal mountings and said connecting means being so proportioned and positioned that both of said wing sections will operatively move in unison, a support within said chamber below said inlet portion for receiving thereon the article to be toasted, and an electrical heating member attached to and disposed between said wing sections, whereby the heating member will move with said wing sections as they are operatively being moved by the article to be toasted, a ratchet member attached to one of said wing sections, a pivotally mounted pawl operatively engageable with said ratchet member, said ratchet member and pawl being so proportioned and positioned whereby the pawl holds the wing section to which the ratchet member is attached against pivotal movement from its lowermost operative position, and means for moving said pawl out of engagement with said ratchet member.

5. In a toaster, a casing defining an internal heating chamber and having a variable upper inlet portion communicating with said chamber, said inlet portion having at a lateral side thereof a substantially horizontally extending upper wing section pivotally mounted at the upper portion of the casing and rotatable about a horizontal axis, the inner leading edge of said wing section defining one side of said inlet portion, said wing section being proportioned and positioned for engagement by the article to be toasted upon the operative insertion thereof into said inlet portion, said wing section being movable between a normal retracted position to operative projected positions within said chamber, whereby different operative positions of said wing section determine different widths of the inlet portion in accordance with the thickness of said article, a lower pivotally mounted wing section in substantial vertical registry with said upper wing section, connecting means between said wing sections, said wing sections, their pivotal mountings and said connecting means being so proportioned and positioned that both of said wing sections will operatively move in unison, a support within said chamber below said inlet portion for receiving thereon the article to be toasted, and an electrical heating member attached to and disposed between said wing sections, whereby the heating member will move with said wing sections as they are operatively being moved by the article to be toasted, a ratchet member attached to one of said wing sections, a pivotally mounted pawl operatively engageable with said ratchet member, said ratchet member and pawl being so proportioned and positioned whereby the pawl holds the wing section to which the ratchet member is attached against pivotal movement from its lowermost operative position, a cam member engageable with said pawl for actuating it out of engagement with said ratchet member, and means to actuate said cam member.

6. In a toaster, a casing defining an internal heating chamber and having a variable upper inlet portion communicating with said chamber, said inlet portion having at a lateral side thereof a substantially horizontally extending upper wing section pivotally mounted at the upper portion of the casing and rotatable about a horizontal axis, the inner leading edge of said wing section defining one side of said inlet portion, said wing section being proportioned and positioned for engagement by the article to be toasted upon the operative insertion thereof into said inlet portion, said wing section being movable between a normal retracted position to operative projected positions within said chamber, whereby different operative positions of said wing section determine different widths of the inlet portion in accordance with the thickness of said article, a lower pivotally mounted wing section in substantial vertical registry with said upper wing section, connecting means between said wing sections, said wing sections, their pivotal mountings and said connecting means being so proportioned and positioned that both of said wing sections will operatively move in unison, a support within said chamber below said inlet portion for receiving thereon the article to be toasted, a plurality of substantially vertically disposed guard wires operatively connecting said leading edges of said wing sections, an electrical heating member attached to and disposed between said wing sections, whereby the heating member will move with said wing sections as they are operatively being moved by the article to be toasted, said heating member being in spaced relation to said guard wires, spring means urging said wing sections to their upper positions, a ratchet member attached to the upper surface of one of said wing sections, a pivotally mounted pawl operatively engageable with said ratchet member, said ratchet member and pawl being so proportioned and positioned whereby the pawl holds the wing section to which the ratchet member is attached against pivotal movement from its lowermost operated position, a cam member engageable with said pawl for lifting it out of engagement with said ratchet member, spring means urging said pawl downwardly, and a manually operated knob member attached to said cam member.

7. In a toaster, the combination according to claim 6, a partition wall at one side of said heating chamber and spaced from the adjacent wall of said casing, whereby a compartment is formed, said pawl, ratchet member and cam being disposed in said compartment.

8. In a toaster, a casing defining two internal heating chambers and having two variable upper inlet portions communicating with said respective chambers, a stationary upper wall member between said inlet portions, two oppositely positioned pivotally mounted upper wing sections on the outer sides of said respective inlet portions, whereby said stationary wall member and said wing sections define said respective inlet portions, each of said wing sections being rotatable about a horizontal axis, said wing sections being proportioned and positioned for engagement by the articles to be toasted upon the operative insertion thereof into said inlet portions, said wing sections each being pivotally movable between an upper normal retracted position to positions within said chamber, whereby different operative positions of each wing section determine different widths of inlet portion in accordance with the thickness of said article, yieldable means urging said wing section into said upper position, a platform below each inlet portion for receiving theoreon the article to be toasted, a central stationary heating element supported by and extending downwardly from said stationary wall member, a lower pivotally mounted wing section in substantial vertical registry with each of said upper wing sections, pivotal connecting means between each pair of said wing sections that are in vertical registry, whereby the wing sections of each pair will move in unison, and an electrical heating member attached to and disposed between the wing sections of each of said pairs, said heating members being substantially parallel to said central heating element, whereby said heating members will move with said respective pairs of wing sections as they are operatively being moved by the article to be toasted.

References Cited in the file of this patent

UNITED STATES PATENTS

| | | |
|---|---|---|
| 2,047,046 | Wade | July 7, 1936 |
| 2,109,079 | Ziegler et al. | Feb. 22, 1938 |
| 2,489,500 | Pulliam | Nov. 29, 1949 |
| 2,764,081 | Glasser | Sept. 25, 1956 |
| 2,816,501 | Meyers | Dec. 17, 1957 |